Dec. 2, 1924.  1,518,115
P. S. WARD
FRICTION CLUTCH
Filed Aug. 26, 1922   2 Sheets-Sheet 1
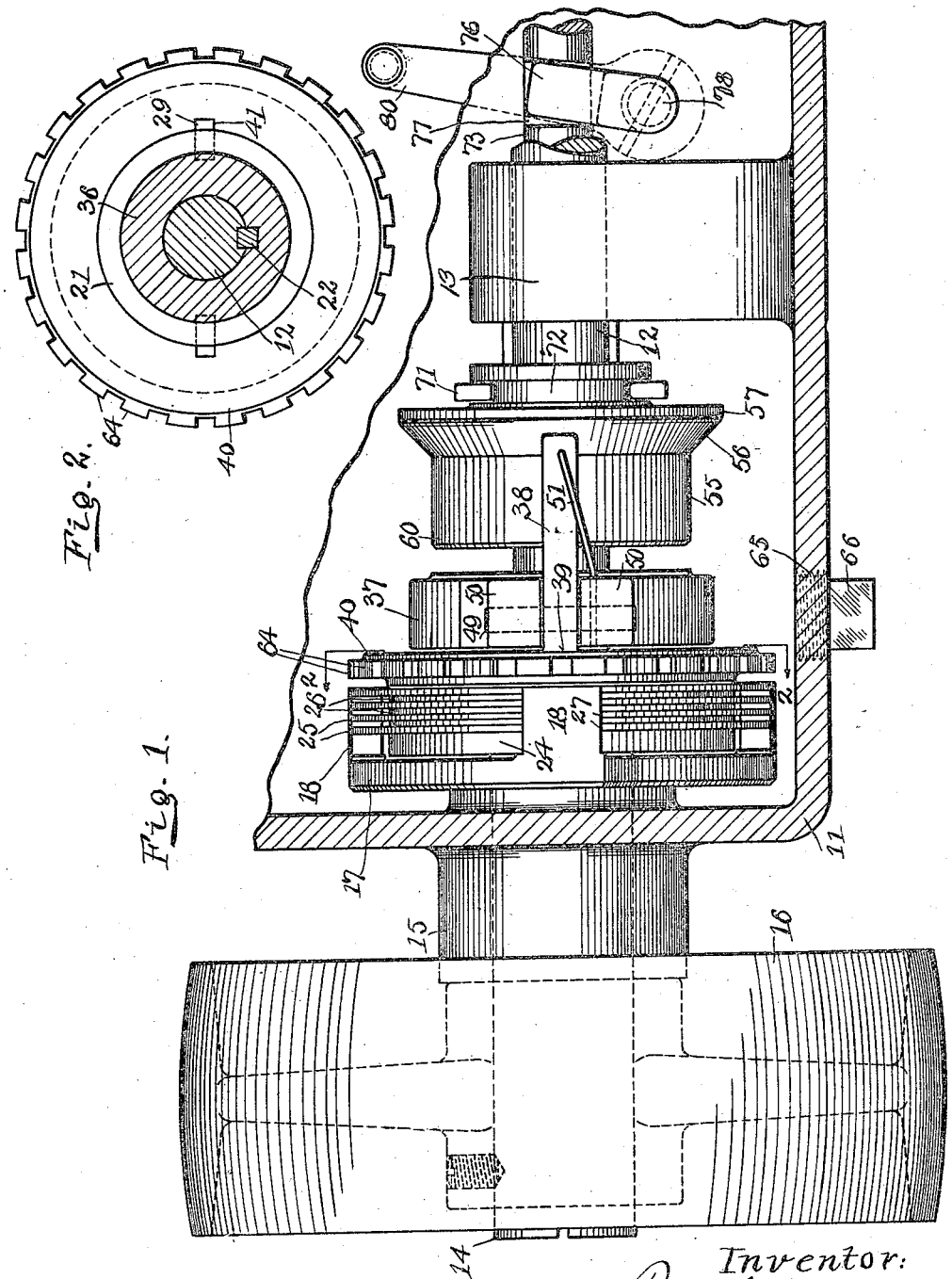
Inventor:
Paul S. Ward
His Attorney

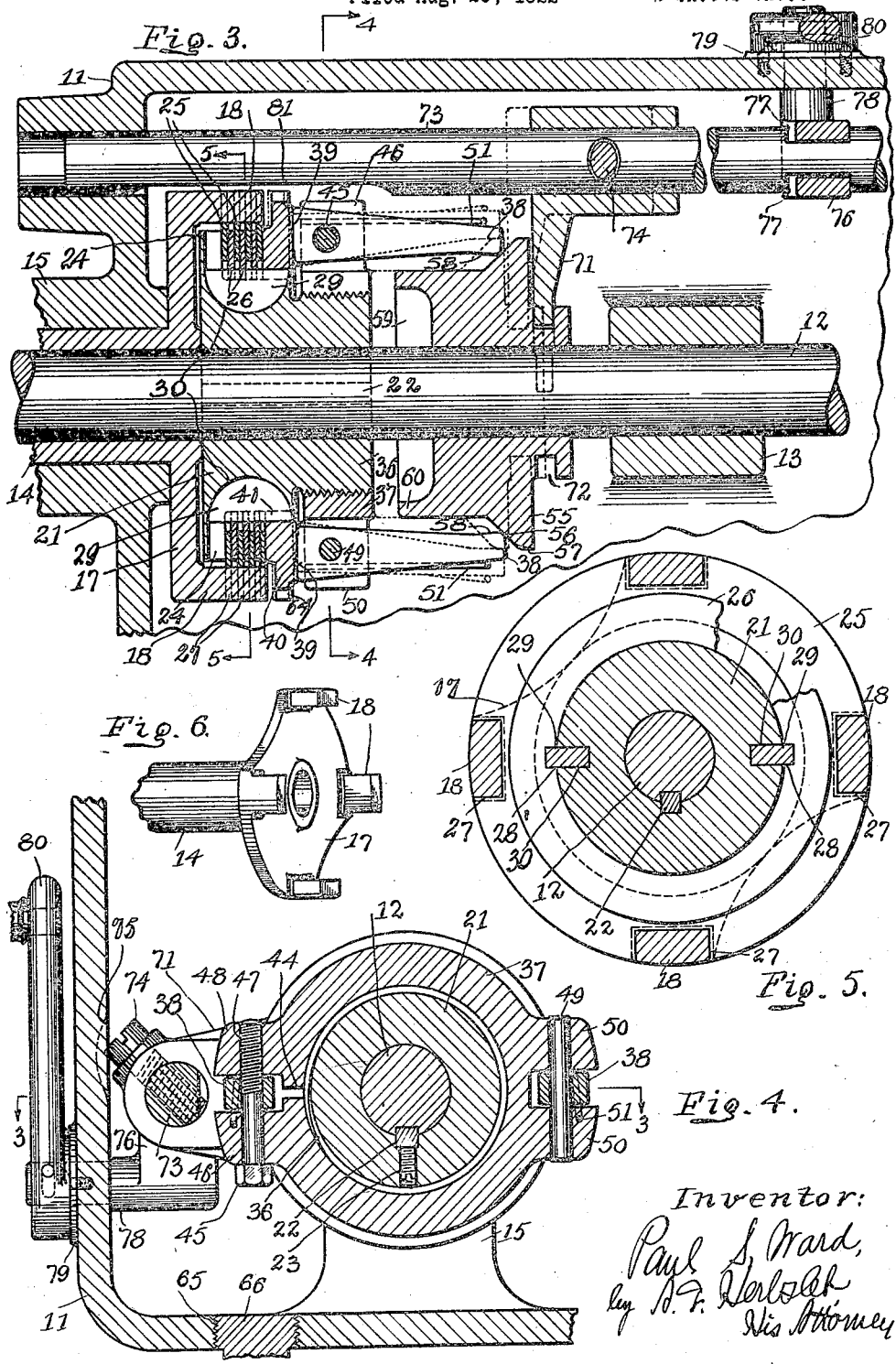

Patented Dec. 2, 1924.

1,518,115

UNITED STATES PATENT OFFICE.

PAUL S. WARD, OF CINCINNATI, OHIO, ASSIGNOR TO THE TRIUMPH MANUFACTURING COMPANY, OF CINCINNATI, OHIO, A CORPORATION OF OHIO.

FRICTION CLUTCH.

Application filed August 26, 1922. Serial No. 584,409.

*To all whom it may concern:*

Be it known that I, PAUL S. WARD, a citizen of the United States, residing at Cincinnati, in the county of Hamilton and State of Ohio, have invented certain new and useful Improvements in Friction Clutches, of which the following is a specification.

My invention relates to clutches of the friction type, and it is the object of my invention to provide novel means whereby to adjust the pressure exerted between the friction members; further, to provide novel means whereby to cause the limit of actuating movement of the actuating member toward the friction clutch to be constant throughout the adjustments in the clutch; and, further, to provide novel means for supporting and causing relative movement between the friction elements.

The invention will be further readily understood from the following description and claims, and from the drawings, in which latter:

Fig. 1 is a side elevation of my improved device, the casing thereof being shown broken away.

Fig. 2 is a cross-section of the same, taken on the line 2—2, of Fig. 1.

Fig. 3 is an axial section of the same, taken in the plane of the line 3—3, of Fig. 4, showing the operating means for the clutch adjacent to the clutch in release relation in full lines and in actuated relation in dotted lines.

Fig. 4 is a cross-section of the same, taken in the plane of the line 4—4, of Fig. 3.

Fig. 5 is a detail in cross-section, taken in the plane of the line 5—5, of Fig. 3; and, Fig. 6 is a perspective view of the lug element.

A suitable casing 11 may be provided. A shaft 12 is journaled in a bearing 13, and in a hub 14, the hub being in turn journaled in a suitable bearing 15. A propelling member, shown as a pulley 16, is fixed to the hub, and the shaft is arranged to be attached to a suitable propelling member and to be held axially, by means not shown, as any suitable means may be employed for the purpose. The hub is shown integral with a disk 17 from which lugs 18 project.

A hub 21 is fixed to the shaft, as by means of a key 22 and a set-screw 23. This hub is provided with an abutment, shown as an annular flange 24. A set of friction plates 25 and a set of friction plates 26 are received about the hub 21, the lugs 18 projecting about the annular flange and the friction plates.

The friction plates 25 are outer friction plates and are provided with slots 27 in which the lugs 18 are received for forming rotative driving connection between the lug member and said set of friction plates, this driving connection permitting endwise movement of the friction plates.

The friction plates 26 are inner friction plates and are provided with slots 28 in which keys 29 are received, the keys being let into and held in grooves 30 in the hub 21. The slot and key connection between the friction plates 26 and the hub 21 forms a rotative driving connection permitting endwise movement of the friction plates.

Either the lug member or the hub member may be the driving member of the couple, the other member being the driven member.

The hub 21 is provided with a threaded end 36, shown as a reduced end. A collar 37 is threaded on this threaded end. Levers 38 are pivoted on this collar, the levers being cam-levers provided with cam-faces 39, arranged eccentric to the pivotal axes of said levers. These cam-faces coact with a collar 40 about the hub arranged to act on the friction plates with a pressing action to cause pressure between the friction plates, and itself serving as a friction plate. The pressure collar 40 is shown provided with slots 41 in which the keys 29 are received, the pressure collar 40 having axial movement on the hub and keys.

The threaded collar 37 is exemplified as a split collar, being provided with a split 44. A bolt 45 is journaled in a lug 46 at one side of the split and is threaded into a threaded hole 47 in a lug 48 at the other side of the split. One of the cam-levers is pivoted on this bolt. The other cam-lever is pivoted on a pin 49 located in lugs 50 on the threaded collar. Springs 51 are fixed in the threaded collar and bear on the cam-levers to normally retract the cam-levers.

The means for actuating the cam-levers are exemplified as comprising a frusto-conical collar 55, slidable axially on the shaft 12, the frusto-conical face 56 of which is arranged to coact with the outer or swinging ends of the cam-levers to actuate the same. The collar 55 is provided with a cylindrical riding face 57 at the highest part of the frusto-conical face thereof, adapted to coact with contact-faces 58 at the inner sides of the outer ends of the cam-levers, these contact-faces being parallel with each other or concentric with the riding face 57 when the friction-clutch is in engaged relation, so that axial movement of the operating collar 55 or its operating device may take place in engaging direction after full engagement of the clutch without affecting such engagement, in order that some other function may be performed during such additional movement, for instance as shown, described and claimed in my copending application for patent on improvements in speed changing mechanism, Serial No. 595,759, filed October 20, 1922.

The operating collar 55 is provided with an end recess 59, in which the end of the hub 21 may be received when the adjustment of the collar 37 is such as to cause the threaded end of the hub to protrude beyond the outer end of the threaded collar. The end of the wall 60 of this recess is arranged to strike the outer end of the threaded collar upon fully engaged relation in the clutch throughout all adjustments of the threaded collar.

The adjustments of pressure relation in the friction-clutch are obtained by adjustment of the threaded collar on the hub 21, this adjustment adjusting the distance between said threaded collar and the flange 24 on the other end of the hub. The amount of movement of the outer ends of the cam-levers is the same throughout these adjustments, due to the relation of the contact-faces 58 and 57, as just explained.

In order to permit the ready adjustment in axial direction between the threaded end 36 of the hub 21 and the threaded collar, I provide the collar 40 with outer peripheral teeth 64, and the casing with an opening 65, normally closed by a threaded plug 66. By inserting a socket-wrench through said hole, the bolt 45 may be turned for unclamping the threaded collar. By inserting a tool, for instance a screw-driver, through said hole into contact with the threaded collar, for instance against its wings or its cam-levers, the same may be held, while with another tool, for instance a screw-driver, inserted through said hole, the hub may be turned by engagement with and pressure exerted upon the teeth 64. When proper adjustment has been obtained the threaded collar may be again clamped by turning the bolt 45.

The means for axially moving the frusto-conical collar are exemplified as a fork 71 received in an annular groove 72 in said collar, the fork being fixed to an axially movable shaft 73 by means of a screw 74, the head of which is received in a recess 75 in the wall of the casing. The tines of a fork 76 are received in recesses 77 in the sides of the shaft 73. The fork 76 is fast on a rock-shaft 78 journaled in a bearing 79 in the casing, and has an operating handle 80 fixed thereto. The side of the shaft 73 may be provided with a recess 81 at the friction clutch.

It is obvious that changes may be made in the structure I have preferred to show, without departing from the spirit of my invention within the scope of the appended claims.

My improved friction clutch is simple, of few parts, is readily adjustable for definite clamping force between the friction elements unaffected by extents of movements in the operating element, and definite limit of clamping movement is assured throughout the various adjustments for clamping force.

Having thus fully described my invention, what I claim as new, and desire to secure by Letters Patent, is:

1. In a friction clutch, the combination of a pair of sets of friction plates, a driving member and a driven member constituting a pair of members, driving connection between one of said members and one of said sets of friction plates, driving connection between the other of said members and the other of said sets of friction plates, said driving connections constructed for relative axial movements of said friction plates, limiting means at one end of said friction plates for limiting axial movement of said friction plates, a collar at the other end of said friction plates, actuating levers for clamping said friction plates pivoted on said collar, means for adjusting the distance between said collar and said limiting means comprising a threaded connection between said collar and said limiting means, a second collar mounted for axial movement with relation to said first-named collar and said limiting means, said second-named collar and said levers provided with a cam face for moving said levers into clutch-engaging position and with parallel faces whereby continued movement of said second-named collar in clutch-engaging direction is permitted for continued clutch-engagement and for the purpose herein specified.

2. In a friction clutch, the combination, with a casing provided with an opening, of a pair of sets of friction plates, a driving member and a driven member constituting a pair of members, driving connection between one of said members and one of said sets of friction plates, driving connection between the other of said members and the other of said sets of friction plates, said driving connections constructed for relative axial movements of said friction plates, one of said members provided with an abutment for limiting axial movement of said friction plates and with a hub received through said friction plates, a collar threaded to said hub for adjustment of said collar relative to said abutment, a second collar rotating with said hub and having movement in axial direction with relation hereto, said second-named collar provided with means adjacent said opening whereby to rotate the same for adjustment of said threaded connection between said hub and said first-named collar, and cam-levers pivoted to said first-named collar, all located in said casing, and actuating means for said cam-levers, and constructed and arranged whereby a tool may be received through said opening for engagement with said means whereby to rotate said second-named collar, substantially as described.

3. In a friction clutch, the combination of a rotatable hub, friction members, means for causing pressure between said friction-members comprising a collar having threaded adjustable connection with said hub for adjustment of said hub in said collar cam-levers pivoted to said collar, and an axially slidable frusto-conical collar provided with a contact-face and said cam-levers provided with coacting contact-faces for the latter, said coacting contact-faces parallel with each other upon fully engaged relation between said friction members, and said axially slidable collar arranged for abutment with said first-named collar throughout the adjustments of said hub within said first-named collar, and said coacting contact-faces on said levers being parallel with each other upon abutment between said collars throughout said adjustments of said hub within said first-named collar.

In testimony whereof, I have hereunto signed my name in the presence of two subscribing witnesses.

PAUL S. WARD.

Witnesses:
  DELMA WERNSING,
  DAWSON E. BRADLEY.